US005760767A

United States Patent [19]

Shore et al.

[11] Patent Number: 5,760,767
[45] Date of Patent: Jun. 2, 1998

[54] METHOD AND APPARATUS FOR DISPLAYING IN AND OUT POINTS DURING VIDEO EDITING

[75] Inventors: Samuel R. Shore, Oakland; Douglas Koji Tao; Adelheid Maria Schoolcraft, both of San Jose; Richard A. Bardini, Los Gatos; Michael A. Kutner, Mountain View; Oliver Frederick Morgan, San Jose, all of Calif.

[73] Assignees: Sony Corporation, Tokyo, Japan; Sony Electronics, Inc., Park Ridge, N.J.

[21] Appl. No.: 548,753

[22] Filed: Oct. 26, 1995

[51] Int. Cl.[6] ................................................ G06F 3/00
[52] U.S. Cl. ...................................... 345/328; 345/349
[58] Field of Search .................................. 345/326–358

[56] References Cited

U.S. PATENT DOCUMENTS

| | | | |
|---|---|---|---|
| 4,283,745 | 8/1981 | Kuper et al. | 360/13 |
| 4,365,313 | 12/1982 | Menezes et al. | 364/900 |
| 4,394,745 | 7/1983 | Menezes et al. | 364/900 |
| 4,754,342 | 6/1988 | Duffy | 360/14.3 |
| 4,805,042 | 2/1989 | Nishikata | 360/14.3 |
| 5,029,013 | 7/1991 | Hiratsuka et al. | 358/335 |
| 5,191,645 | 3/1993 | Carlucci et al. | 395/328 |
| 5,206,929 | 4/1993 | Langford et al. | 395/328 |
| 5,218,672 | 6/1993 | Morgan et al. | 395/162 |
| 5,237,648 | 8/1993 | Mills et al. | 395/133 |
| 5,307,456 | 4/1994 | MacKay | 395/349 |
| 5,339,393 | 8/1994 | Duffy et al. | 395/328 |
| 5,428,774 | 6/1995 | Takahashi et al. | 395/600 |
| 5,438,423 | 8/1995 | Lynch et al. | 358/335 |
| 5,448,315 | 9/1995 | Soohoo | 348/722 |
| 5,465,120 | 11/1995 | Schultheiss | 348/716 |
| 5,497,243 | 3/1996 | Sakata et al. | 358/342 |
| 5,519,828 | 5/1996 | Rayner | 395/328 |
| 5,526,132 | 6/1996 | Tsubota et al. | 358/335 |
| 5,532,830 | 7/1996 | Schuler | 358/335 |

OTHER PUBLICATIONS

Tonomura et al., "Content Oriented Visual Inteface Using Video Icons for Visual Database Systems", IEEE Workshop on Visual Languages, pp. 68–73. Oct. 1989.

*Primary Examiner*—John E. Breene
*Attorney, Agent, or Firm*—Blakely, Sokoloff, Taylor & Zafman

[57] ABSTRACT

In the method and apparatus of the present invention, an editing system and method is provides that is sophisticated in features but easy to use. In one embodiment, the system includes multiple input sources, such as tape and live sources, at least one output recording device, at least one monitor, and a editing controller, such as a general purpose computer, which controls the input and output device. The controller further provides an innovative graphical user interface that intersperses video from the input devices along with control functions which the user can select using a mouse, keyboard or other input device.

30 Claims, 14 Drawing Sheets

METHOD AND APPARATUS FOR DISPLAYING IN AND OUT POINTS DURING VIDEO EDITING

BACKGROUND OF THE INVENTION

1. Field of the Invention

The present invention relates to the editing of moving images such as audio/video images. More particularly, the present invention relates to the user interface that provides sophisticated editing functions that are easy to implement.

2. Art Background

Editing of moving images occurs in a variety of environments including the television environment. Although a variety of sophisticated editing equipment is available, television programs that provide little time between taping and broadcast require an easy to use editing system that enable the user, i.e., editor, to quickly select scenes from raw tape footage and manipulate those scenes into a finished product for broadcast. An example where this functionality is desirable is a news program. In a news program environment, unedited source material is usually taped a short time before actual broadcast. The editor must then quickly select the scenes and arrange the scenes to broadcast.

SUMMARY OF THE INVENTION

In the method and apparatus of the present invention, an editing system and method is provided that is sophisticated in features but easy to use. In one embodiment, the system includes multiple input sources, such as tape and live sources, at least one output recording device, at least one monitor, and an editing controller, such as a general purpose computer, which controls the input and output device. The controller further provides an innovative graphical user interface that intersperses video from the input devices along with control functions which the user can select using a mouse, keyboard or other input device.

Using this system, the user first finds each scene from an input device and creates a log card for a clip created therefrom by designating an in point and out point of the clip. The system responds by displaying a visual log card, providing a visual image of a frame of the clip and selective data regarding the clip. The user can continue to create log cards using this process. The user can then move selected log cards to a timeline on the display. The timeline visually reflects the sequence and duration of play of the clips located on the timeline. The user is then able to edit the timeline by editing the sequence, duration and start and end points of the different clips on the timeline. Visual cues provided as part of the graphical user interface simplify the editing functions. In addition, visual feedback, such as playback of certain portions of clips during the editing functions, assist the user in completion of the edit. Once editing is complete, the user can have the timeline output an output medium, such as tape for recording or a broadcast, the output consisting of the clips arranged in the sequence as reflected by the timeline and each having a start and end point as reflected by the timeline and corresponding log cards.

BRIEF DESCRIPTION OF THE DRAWINGS

The objects, features and advantages of the present invention will be apparent to one skilled in the art in light of the following detailed description in which.

DETAILED DESCRIPTION

The system and method of the present invention provides a sophisticated but easy to use system for editing moving images such as video. This system is particularly useful is a dynamic environment, such as the news program environment, in which little, if any, time exists between the recording of video clips and the editing of the clips to the broadcast product. In the following description, for purposes of explanation, numerous details are set forth, in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
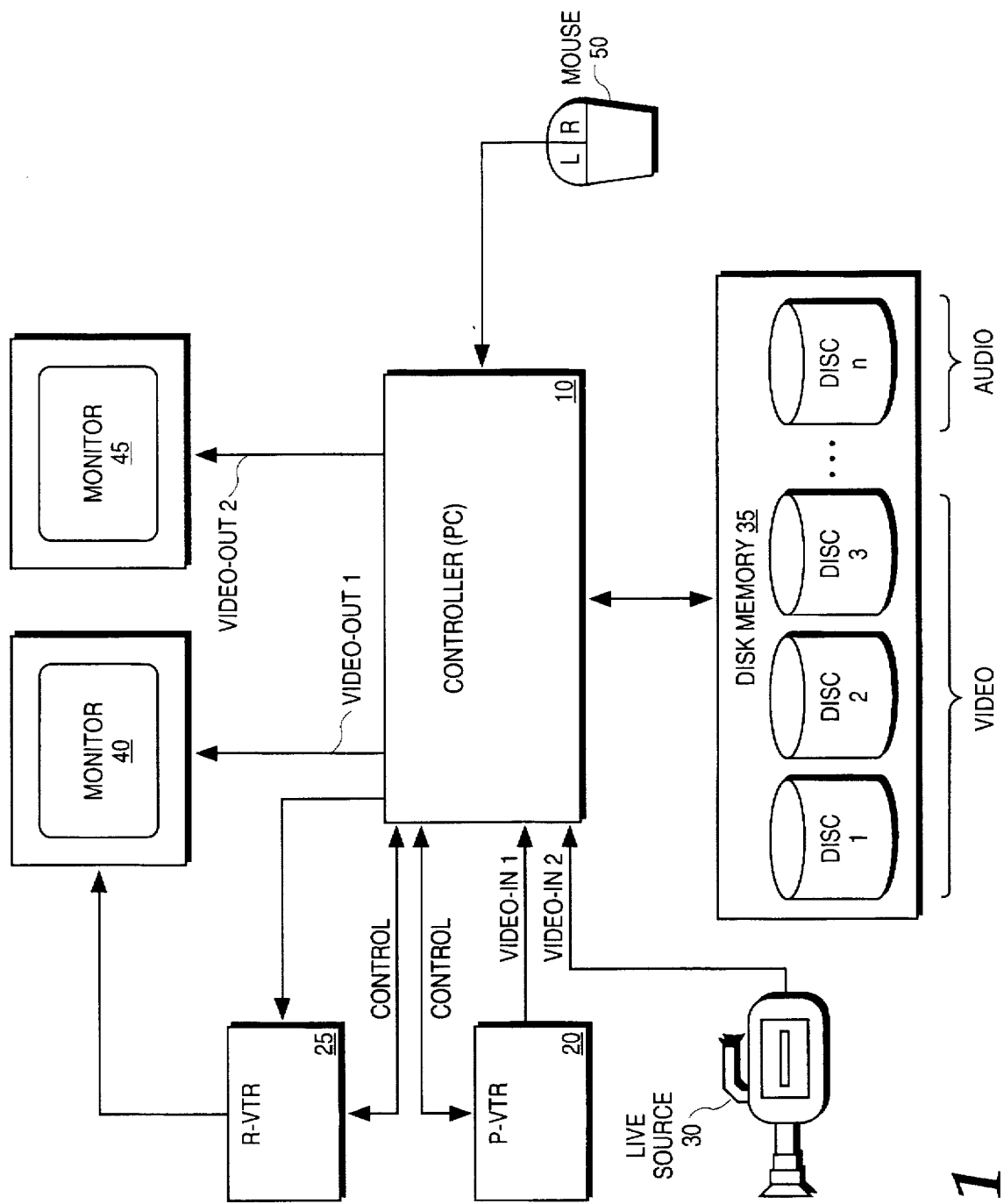
FIG. 1 is a simplified block diagram of a system that operates in accordance with the teachings of the present invention.

A simplified block diagram of an exemplary system that operates in accordance with the teachings of the present invention is illustrated in FIG. 1. FIG. 1 is a simplified block diagram of a video editing system consisting of a controller 10, playback video tape recorder (P-VTR) 20, record VTR (R-VTR) 25, live source input 30, disk memory 35, monitors 40, 45 and mouse 50. The system and method will be described in the context of a video editing system. However, it is readily apparent that the system and method is not limited as such and systems and method for the editing of other types of moving images are also contemplated. Other types of input devices, such as a keyboard (not shown) may also be used. Furthermore, the description refers to "video"; it should be recognized that corresponding audio is also played back, edited and recorded in accordance with the teachings of the present invention.

It is readily apparent that the editing system is exemplary and that other types of editing systems that utilize playback mechanisms are contemplated. For example, the editing system can be configured to edit non-video input. In addition, it is contemplated that variations of the system of FIG. 1 can be implemented within the teachings of the present invention.

Figure 2:
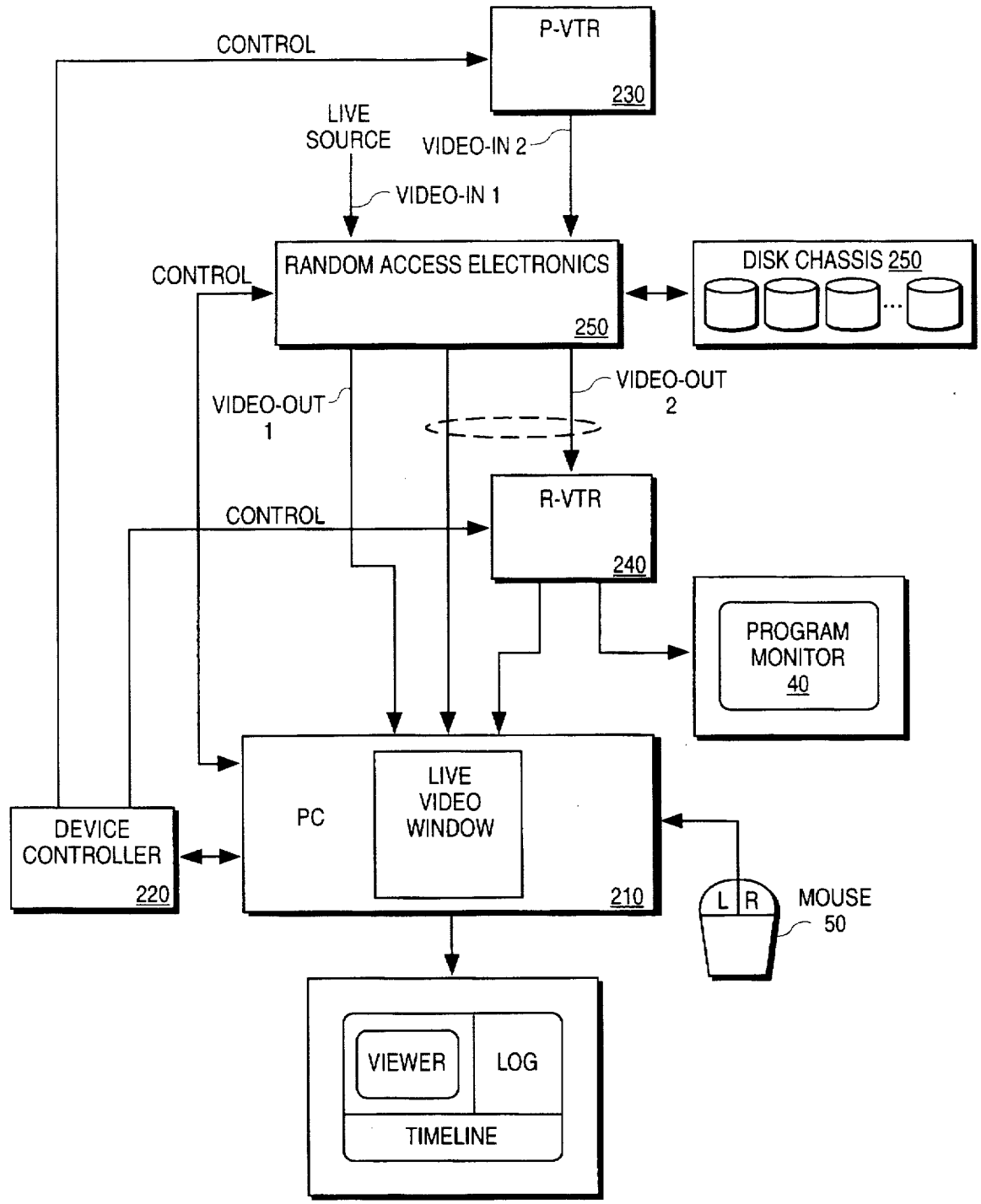
FIG. 2 is an alternate embodiment of a simplified block diagram of a system that operates in accordance with the teachings of the present invention.

For example, in the embodiment illustrated in FIG. 2, a general purpose computer 210 provides most of the functionality of the controller 10 (FIG. 1); the device controller 220 receives control signals from computer 210 and controls the playback and recording functions of P-VTR 230 and R-VTR 240, and the random access electronics circuit 250 receives control signals from computer 210 and controls access to the disk memory 260.

Referring to FIG. 1, the controller 10 performs a variety of functions associated with the video editing system. However, with respect to the present invention, the controller 10, receives cursor input from mouse 50 and controls the playback of playback sources, for example, P-VTR 20, R-VTR 25 and disk memory 35 to cause moving images to be displayed on monitors 40 and 45 in accordance with the teachings of the present invention. The controller can also receive other input sources, for example, live source 30, for use in the editing process.

As noted above, the system includes three playback sources, P-VTR 20, R-VTR 25 and disk memory 35. It is readily apparent that other types of playback sources can be used in the system and be controlled by mouse 50 through controller 10. In the present embodiment, the playback VTR, P-VTR 20, provides videotape input (i.e., video clips) for editing. Typically, the video played back from P-VTR 20 is displayed on monitor 145, but can also be displayed on monitor 240. As noted above, a second source for editing is live source 30. In addition, disk memory can function as a storage and playback mechanism of digital video under control of controller 10. The disk memory 35 can be formed of a variety of media including magnetic, optical or other non-volatile memory media.

Once the images are edited, the edited product is recorded by the recording VTR, R-VTR 25. Playback of the edited product recorded by R-VTR 25 is preferably displayed on monitor 240, but can also be displayed on monitor 145.

In the present embodiment, monitor 145 displays the graphical user interface (GUI) in accordance with the teachings of the present invention. The GUI and associated functionality will be discussed in terms of the functions provided. In the present embodiment, the display on the monitor 145 and thus the GUI and associated functionality is controlled by the controller 10, more particularly, a general purpose computer executing code to generate the GUI and perform the functionality described. Therefore, to simplify the description, details regarding the code executed will be described in functional form; specific implementations of code will be apparent to one skilled in the art from the functional description.

Figure 3:
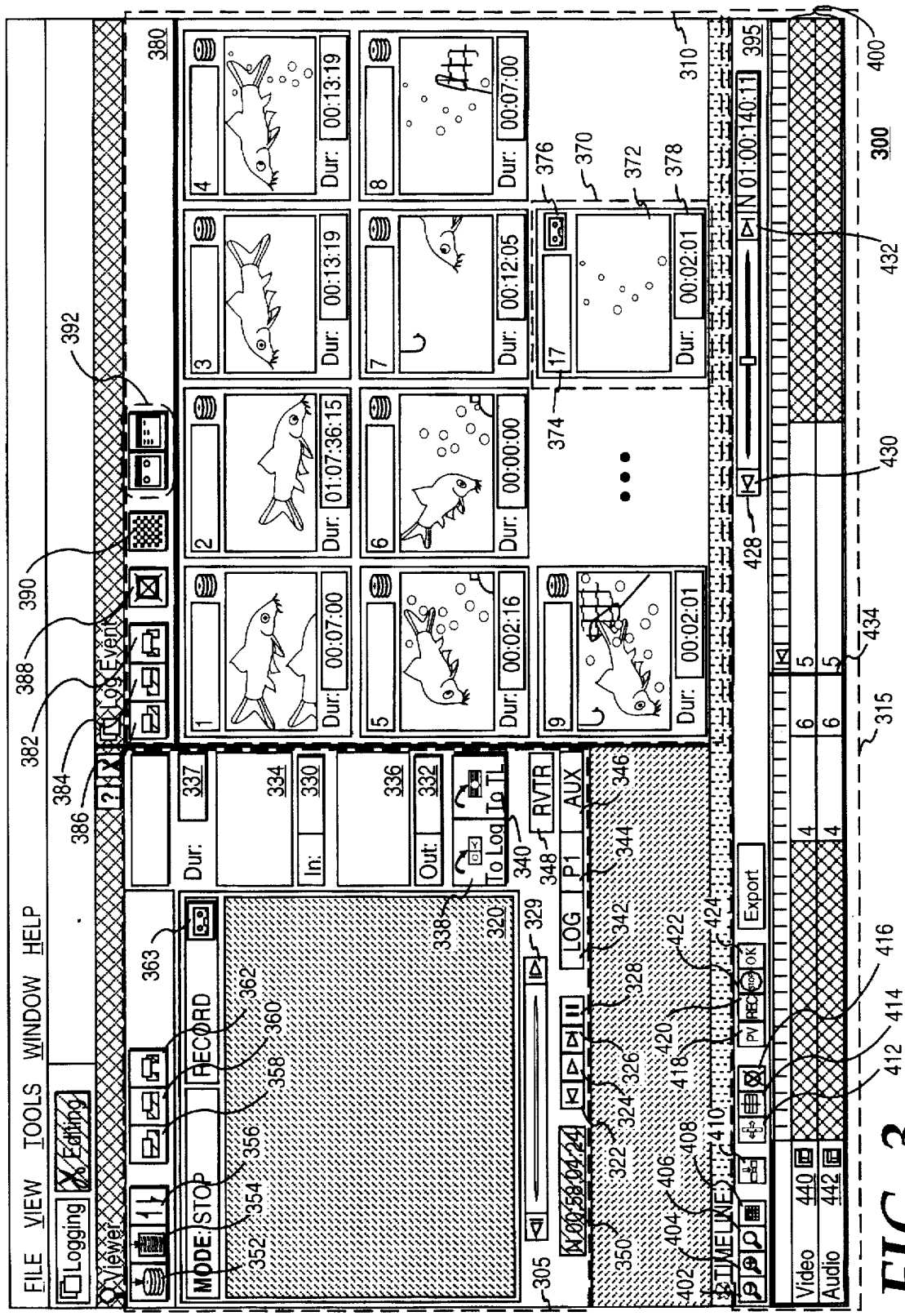
FIG. 3 is one embodiment of a display that provides the visual information utilized by the user to perform the editing functions.

FIG. 3 illustrates an exemplary GUI generated by the controller 10 in accordance with the teachings of the present invention. The GUI shown in FIG. 3, complies with the Microsoft Windows® standard (Microsoft Windows is a registered trademark of Microsoft Corporation); however, it is readily apparent that the GUI can be adapted to comply with other GUI standards.

Referring to FIG. 3, the GUI 300 can be described as consisting of three main areas of interest: viewer area 305, log event area 310 and timeline area 315. The areas of interest are referred to herein as "areas". However, it is readily apparent to one skilled in the art that, in accordance with GUI standards employed, these areas may be defined as one or separate windows. The viewer area 305 is formed of a number of sub-areas. The primary focus is the actual playback area 320 in which the input video is played back for the user. Using the viewer 305, for example, the user can review raw video footage in the playback area 320 to find the video clips of interest to log as events. In addition, as will be explained in detailed later, the viewer area 305 is also used to play back logged events and events as they occur on timeline 315. Thus, a single viewer area 305 is used for a variety of purposes, enabling the user to have one visible focus area for play back.

Control of the speed and the play back of video is achieved within the viewer area 305. One method is to utilize the forward/reverse/still buttons 322, 324, 326, 328 provided. Alternately, the user can use scroll bar 329 to perform frame forward/frame reverse functions. Although a variety of control mechanisms can be used, wherein the controller 10 (FIG. 1) controls the source inputs 20, it is preferred that it is cursor controlled. More particularly, in the present embodiment, a cursor (not shown) is displayed superimposed over the video played back in playback area 320. Using a cursor control device, such as a mouse, the user can move the cursor predetermined directions and predetermined distances to cause the play back apparatus (20 FIG. 1) to provide play back of video in the forward or reverse directions at speeds corresponding to the distance the user moved the cursor within the playback area 320.

The viewer area 305 also includes elements for enabling the user to create log cards. A log card is delineated by an in point and an out point. Buttons 330, 332 are respectively provided to generated the in points and out points using a cursor control device. Of course, other mechanism may also be provided to enable the user to generate the in points of and out points of log cards. In the present embodiment, during creation of a log card, the frame indicative of the in point is displayed within area 334 once the in point is selected. Correspondingly, the frame corresponding to the frame at which the out point is selected is displayed in area 336. This provides user visual data that enables the user to easily determine certain information regarding the log card. Once the in points and out points are selected, the duration of the clip is displayed in area 337.

Other sub-areas of the viewer area 305 provide the user additional data and additional functions. Display buttons 338, 340 respectively provide the functions of saving as a log card the current clip displayed in area 320 and the saving of a log card directly to the timeline area 315. Others buttons include those to select the source of input to be the log event area, a primary or auxiliary input or the record output device, buttons 342, 344, 346, 348. The timecode area 350, displays timecodes corresponding to the video played back in playback area 320. Buttons 352, 354, 356 respectively provide, when selected, auto disk save, auto log functions and viewer alignment functions. Icon 363 reflects the source device of the currently displayed image. In addition, as will be described in more detail below, buttons 358, 360, 362 enable the user to directly place the clip displayed in playback area 320 on timeline using the overlay or insert functions provided by the buttons 358, 360, 362.

The log event area 310, displays the clips generated by the user. More particularly, as shown in the embodiment of FIG. 3, the log event area is formed of a plurality of log cards 370 created by the user. The log cards 370 reflect the clips created by the user during the play back of source inputs. More particularly, the log cards provide a visual representation of the clips generated by the user. In addition, associated with each log card is the necessary control data needed by the system to retrieve the video corresponding to the log card.

A variety of log card formats are contemplated. In the embodiment illustrated by FIG. 3, a single frame image is displayed. Alternately, for example, two frame images, reflecting the frame at the start point and the frame at the end point of the clip are displayed within the log card. The log cards provide the visual feedback and corresponding control of the video from the input devices to enable the user to edit the video clips to provide an output.

In the embodiment shown in FIG. 3, each log card 370 includes a frame display area 372, log number 374, source device 376, and timecode 378. The frame display area displays an illustrative frame of the clip represented by the log card 370. Preferably, the frame display area 372 displays either the frame at which the in point was selected or the frame at which the out point was selected. The log number 374 is the log card number assigned to the log card 370. As will be discussed below, the log number is used in the timeline display to identify each clip located on the timeline. The source device icon 376 identifies the source device from which the video is retrieved. In the present illustration, the icon reflects that the source device is a video tape apparatus. The timecode area provides timecode information regarding the clip. In the present embodiment, the timecode area 378 displays the duration of the clip. In other embodiments, the timecode of the start point or the timecode of the end point are contemplated.

The log event toolbar area 380 includes a number of buttons selectable by the user using an input device such as a cursor control device. Editing buttons 382, 384, 386 are exemplary of the type of editing functions available and correspond to editing buttons 358, 360 and 362 provided in the viewer area toolbar 359. Selection of button 382 causes an insert edit of the selected log card to the timeline area 315. Buttons 386, 384 respectively provide overlay edit and back timed overlay edit of the selected log card to the timeline area. The insert edit function inserts the clip of the selected log card between preexisting clips located on the timeline, shifting clips as necessary to fit the inserted clip. The overlay edit functions causes the clip to overlay all or portions of clips already placed on timeline that overlap. The overlaid portions of the underlying, prior clips are deleted, updating the corresponding log cards.

The delete button 388 deletes the selected log card from the log event display. The record button 390 digitizes the video corresponding to the selected log card, if not already in digital form, and stores the digitized video in the corresponding digital storage device, such as disk storage or memory. The view selection button 392 enables the user to select the format of the log cards. The present embodiment provides for a log view, which is represented by the format shown in FIG. 3, and event view, which displays both the frame representing by the in point and the frame representing the out point.

The timeline area 315 enables the user to visually edit the clips without separately and directly controlling the variety of input sources. As will be explained below, the user simply drags or moves selected video clips to the timeline. Once a log card is moved to the timeline area 315, a rectangular box is displayed on the corresponding track(s), the length of which reflects the duration of the clip. The timeline area 315 is composed of two primary sub-areas: the timeline toolbar 395 and at least one track of edit events 400, which are identified with event numbers corresponding to the log card numbers.

The toolbar area 395 is typically contains most of the rapid access controls normally associated with editing. Preferably, the system provides a default set of functions and the user is able to add other functions as needed. Icons are displayed within the toolbar reflective of specific edit commands. This commands may be easily initiated with a mouse click. Alternately, such functions are selectable by using corresponding function keys or other selection means.

As noted above, the editing functions provided on the toolbar can be customized by the user. In addition, the system can be configured to create an edit decision list (EDL) which records the necessary database information required to repeat the editing process performed on a remote editing apparatus using either copies of the material recorded or using other copies of the material obtained by other means. Once the EDL is prepared, it is exported to the remote editing apparatus for repetition of the editing process. Preferably, this option is available as a menu item to the user.

For completeness, the discussion below will briefly describe exemplary editing functions provided in the example of FIG. 3. The zoom out 402, zoom in 404 icons, when selected, expand or contract the current timeline time radix. Theses buttons cause a cycle until specific limits are reached. The scale set icon 406 selects the ability to toggle between two scale settings of the timeline. For example, using a left mouse click, the previous scale is restored. A right mouse click therefore opens a pop-up box that allows the operator to jump to a particular scale. The miniaudio icon 408, when selected, toggles on/off the display of a miniaudio panel superimposed on the right side of the timeline. The ripple on-off icon selects a timeline operation mode. This mode affects operations performed in the timeline (e.g., trimming, deleting, moving). When in the ripple mode, clips are automatically shifted as needed to reflect editing functions.

The trim icon 412, when selected, provides an innovative method for accessing the trim functions on the timeline. As will be described in more detail below, selection of this icon causes a the timeline to provide graphical outputs enabling the user to instantly perform the trim in, trim out functions. If the icon is not selected, the same graphical outputs enable the execution of slide in, slide out functions.

The match cut icon 414 performs an immediate creation of a cut event line at the now line. The now line 434 reflects the frame which is currently displayed in playback area 320. For example, if an edit needs to be split up into two cuts, this icon enables the user to create two events from a single event. The delete icon 416 instantly deletes a selected event. Video reflective of events located on the timeline can be played back in playback area 320 using the preview icon 418. Preferably selection of the preview icon 418 causes playback of the timeline from the now line to the end of the timeline. The record icon 420, when selected, causes a record function to the output device. The all stop icon 422, when selected, performs an all stop function that causes the edit timeline and all associated source disk, source VTR and record VTRs to stop. The OK icon 424 is preferably displayed during timeline trim operations and when dynamic edit have been added to the timeline. Typically, a dynamic edit is one in which is selected during a concurrent recording function. Selection of the icon 424 accepts the edit functions.

The toolbar 395 also includes a scroll bar 428 that enables the user to scroll through the timeline. More particularly, each selection of the previous event icon 430 of the scroll bar 428 will successively move the timeline to the in point of the previous event. When the earliest time is reached, the timeline will stop with the now line at the beginning of the timeline. Similarly, each selection of the next event icon 432 successively moves the timeline to the in point of the next event. When the latest time is reached, the timeline will stop with the now line at one frame past the end of the timeline.

Different tracks are displayed to indicated the sequence of edited material on video and audio tracks which are to be replayed synchronously. At the time a clip is first copied to the timeline, the source material's video, audio 1 and audio 2 tracks can be selectively placed on the corresponding timeline track. For example, background narration source material may be only the audio 1 track. The source video might be black, and the source audio 2 may be silent. The track selection buttons at the left side of the timeline determine which timeline tracks receive source material when it is placed on the timeline from the viewer or log/event areas. For the simple case that the video, audio 1 and audio 2 source tracks are all placed onto the timeline, on each timeline track a box is drawn representing the duration of the selected clip which is of equal length (and duration ) on all tracks. However, the process of editing frequently includes separation of the actual edit points on the various tracks, using the trim, slide and slip functions described later. In an alternate embodiment, additional timeline tracks are contemplated. For example, audio 3 and audio 4 timeline tracks are added. The two source material audio tracks can be assigned to any tow of the timeline audio tracks.

In the embodiment illustrated by FIG. 3, a video track 440 representing the video input from events 4, 5 and 6 and audio track 442 showing the corresponding audio for events 4, 5 and 6 are shown. The location and size of the events noted on the tracks of the timeline reflect the order and duration of the events. In the present illustration, event 4 occurs first, followed by event 6 and event 5. Event 5 is the longest clip and event 6 is the shortest.

Figure 4:
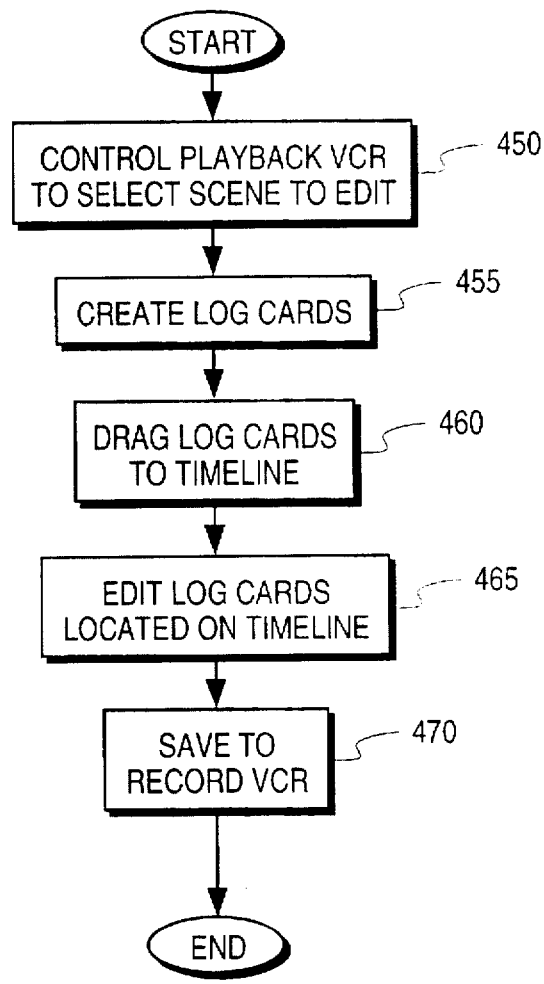
FIG. 4 is a simplified block diagram of one embodiment of the process for creating log cards and manipulating a timeline.

The process performed using the system and GUI described will now be discussed with reference to FIG. 4. At step 450, the user controls the playback VTR to select scenes to that are of interest. Log cards are then created, step 455. Once log cards are created, the events corresponding to the log cards can be moved to the timeline for editing. Alternately, clips marked in the viewer area 305 can be moved directly to the timeline (at which time a log card is automatically created). Using the displayed timeline area, the user can then edit the events located on the timeline, step 465, playing back video of events and previewing video of the edited timeline when desirable. The user can then cause the events located on the timeline to be recorded, step 470, on a recording media such as a recording tape. Alternately, the timeline of events can be output to another media, such as output directly for broadcast. The recording function can be performed at any time, although it is preferable to perform the recording function once editing is completed. If subsequent edits are performed on the timeline after the timeline has been recorded, the system will re-record the timeline as necessary, to reflect the edits.

Figure 5:
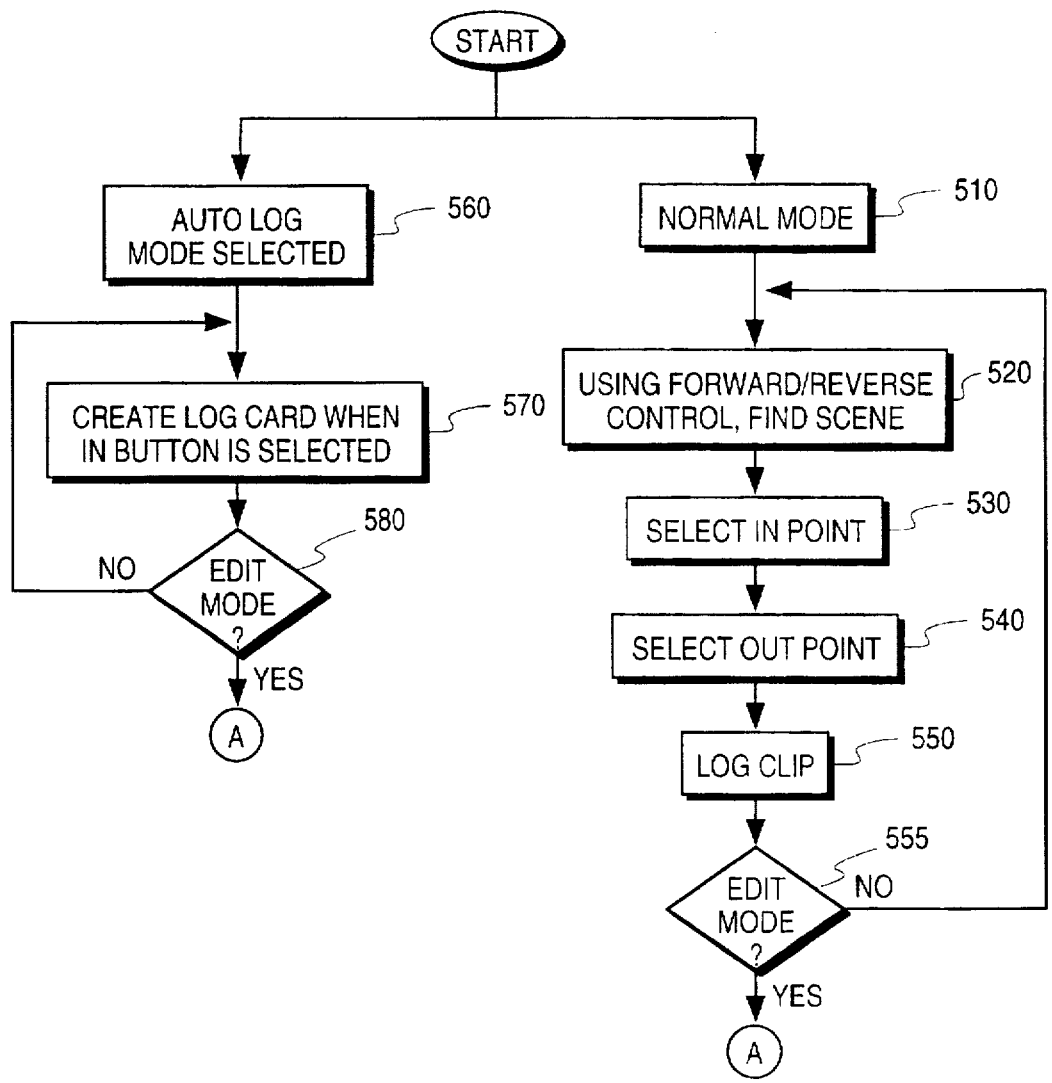
FIG. 5 is a flow chart illustrating one embodiment of the process for creating a log card.

FIG. 5 is a flow diagram that illustrates one embodiment of the innovative process for logging events in accordance with the teachings of the present invention. Preferably a variety of methods are available to the user to create log cards of clips. However, two methods will be discussed herein. In the normal mode, step 510, the user finds the scene of the input video of interest, step 520, by using the controls provided with the system to play, fast forward, reverse the input device (e.g., VTR). As described above, the input video is preferably viewed in the viewer area (305 FIG. 3) of the display and the user utilizes the cursor control device to control the input device and therefore the display of input video. Once the user finds the scene at which the clip is to begin, the user indicates an in point, step 530. In the present embodiment, this is performed by selecting the in button 330 located in the viewer area 305 (FIG. 3). Feedback is then provided to the user in the viewer area 305 by displaying the frame at which the in point was selected in area 334 and placing the corresponding timecode in area 330. The user then determines the end point of the video clip of interest and indicates an end point, step 540. In the present embodiment, this is achieved by selecting the out button 332 in the viewer area 305 (FIG. 3). Once the out point is selected, feedback is provided by the user by displaying the frame at which the out point was selected in area 336. In addition, the time code may be displayed in area 332, and the duration of the clip is displayed in area 337.

Once the in point and out point are selected the user can log the clip, step 550. In the present embodiment this is preferably achieved by selecting the to log button 338. A log card 370 is then created in the log event area 310. Alternately, the user has the option to move the clip to the timeline area 315 and therefore is immediately available for edit. Two methods may be used. One method is to simply select the playback area 320, drag the image down to the timeline area and 315 and drop the image at the desired point in the timeline. Alternately, the to TL button 340 may be used to place the clip directly on the timeline. In both methods it is preferred that a log card is automatically created when the clip is placed on the timeline.

At this point, the user has the option to playback video from its input devices to create more log cards or to enter the edit mode, step 555. Typically, the use will create a plurality of log cards before entering the edit mode. In addition, the user has the capability to review the video of log cards by simply dragging the log card to the playback area 320. The system responds immediately by controlling the input device to play back the portion of video corresponding to the log card.

The user can at any time select to enter the auto log mode, step 560. The auto log mode can be selected by selecting a proper function key or by selecting the appropriate button on the display. In the embodiment depicted by FIG. 3, to select the auto log mode, the user, using the cursor control device, selects button 354. The in button 330 changes color and the To Log button 332 is then grayed to indicate that the function is disabled and to provide the feedback that the auto log mode has been selected. Once in the auto log mode, a log card is created at the selection of each subsequent in point, step 560. It is readily apparent that the user has the capability to switch between auto log and normal modes to create log cards. When the user is ready, the user can decide to edit the clips created, step 570.

Figure 6:
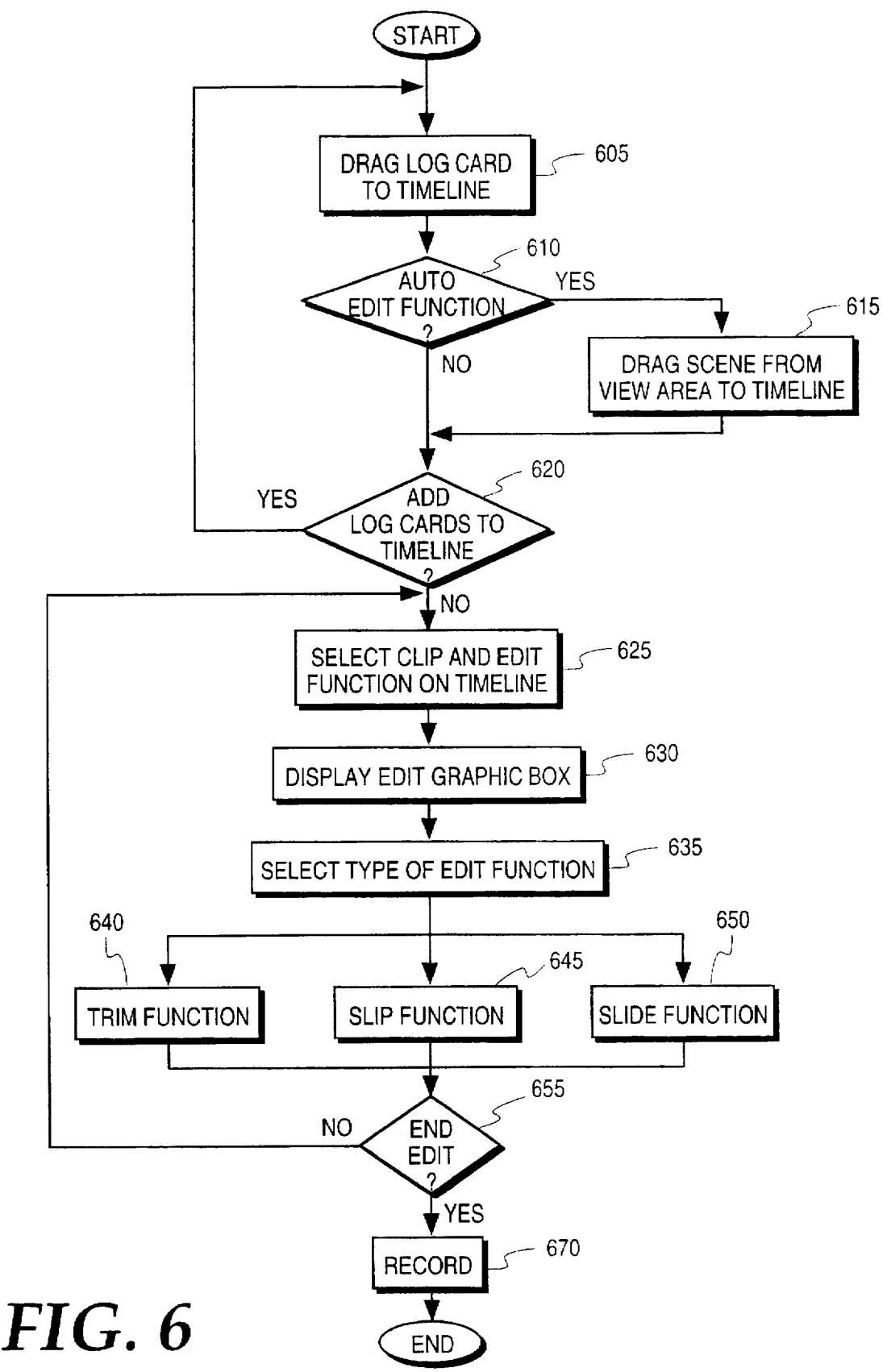
FIG. 6 is a flow chart illustrating one embodiment of the process for manipulating the timeline.

As noted earlier, editing of clips to form a complete event, such as a news broadcast or the like, is performed in the timeline area 315. One embodiment of an editing process is described with reference to FIG. 6. However, the process described is exemplary and it is contemplated that other variations of the editing process can be used.

To begin the editing process, at least one log card or clip must be located in the timeline area. For example, the user can select a log card of interest and drag it to the timeline using the cursor control device, step 605. Other methods can also be used. For example, as mentioned earlier, a clip displayed in playback area 320 can be selected and dragged directly to the timeline area 315 (FIG. 3) for editing, steps 610, 615. Alternately, buttons located in the log event area 310 and viewer area 305 can be used to perform an insert, overlay or back timed overlay edit (e.g., buttons 358, 360, 362, 382, 384 386 FIG. 3). When a clip is placed on the timeline, the system responds by generating a rectangular box, e.g. box 393 (FIG. 3), located at a user specified start point in timeline. The length of the box corresponds to the duration of the clip. The number inside each box is the event number and corresponds to the log card number of the log card in the log event area 310. Thus the user can easily view the currently arranged sequence of clips and the length of the clips. In the illustration provided in FIG. 3, a playback of the timeline would result in the sequence clip 4, clip 6, clip 5. As will be described below, the user can edit the sequence, timing, start/end points and duration of the clips to achieve the desired end product. Therefore, at this point in the process, the user may choose, step 620, to continue adding clips to the timeline or to begin editing functions. Although not shown in the present illustration, additional clips can be added at any time during the editing process by simply performing one of the methods for adding clips to the timeline.

One basic editing function is to change the order of the clips on the timeline. This can be done, for example, by selecting and dragging the box representing a clip to another location on the timeline using the cursor control device. Alternately, insert, overlay and replace editing functions can be used.

To edit a particular clip, the user selects the clip, step 625, using the cursor control device. For example, the clip is selected by single clicking on the corresponding box (e.g., box 393 FIG. 3) of the clip to be edited. The system responds by cueing the input device to the location of the in point of the clip using the in point timecode of the clip, if the clip only exists at the input source, e.g., P-VTR, and replays the clip. If the clip has been recorded to disk memory, the disk is accessed to retrieve and preferably replays the material starting at the in point in the playback area. In either case, the system further provides a graphic editing box in place of the original box of the clip located on a track (e.g., track 400 FIG. 3) of the timeline. An example of the graphic editing box is shown in FIG. 7b. At step 635, the editing function is selected using the graphic editing box and the corresponding function is performed, steps 640, 645, 650.

Once the editing function is complete with respect to a clip, the user can end the edit process 655 or continue at step 625 to perform other edit functions. Although shown in the present embodiment to occur once editing is completed, the record function, step 670, can be performed at any time. The record function causes a stream of video clips, as represented graphically in the timeline area, to be recorded to an output device.

Figure 7A:
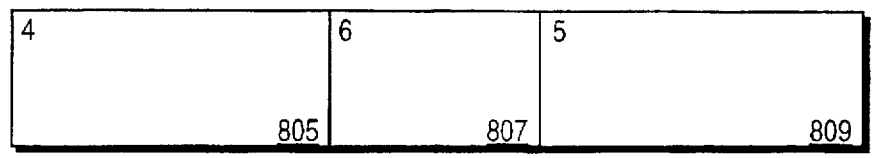
FIGS. 7a, 7b, 7c, and 7d illustrate a graphical edit function in accordance with the teachings of the present invention.
Figure 7B:
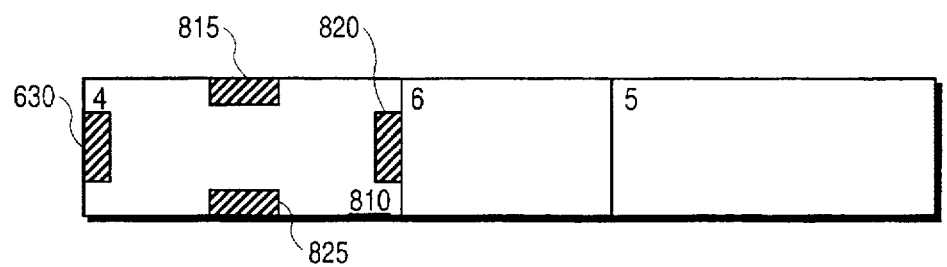

FIG. 7a shows an illustrative portion of a track containing clips 4,6 and 5. FIG. 7b illustrates one embodiment of the graphic editing box 810 which appears when the box 805 corresponding to clip 4 is selected. The box 810 includes a plurality of minibuttons 815, 820, 825, 830 along the inside perimeter of the box 810. As is readily apparent to one skilled in the art, the size, location within the box and number of minibuttons can be varied.

In the present embodiment, the following editing functions are provided through selection of the minibuttons 820, 825, 830: trim out/slide out mode, slip source mode and trim in/trim out mode. In the present embodiment, box 815 is currently not used. Furthermore, it is readily apparent that other editing functions can be provided in addition to or in place of the functions discussed herein.

To select a particular edit function, the user, utilizing a cursor control device, moves the cursor to the corresponding minibutton and selects the button. In the present illustration, for example, if the slip source mode button 825 is selected, the in and out points of the selected clip are shifted in time, while maintaining the overall duration of the clip the same. Preferably, margins are associated with each in point and out point of the clip, enabling the slide function to be easily performed. It should be noted that as the in points and out points, but not the duration, of the clip are affected, the clips 807, 809 are not affected by the slide editing function.

Figure 7C:
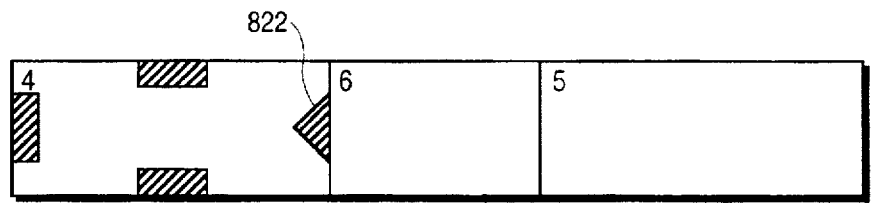
Figure 7D:
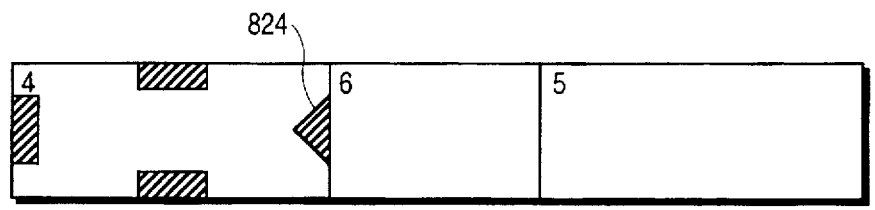

If minibutton 820 is selected, the trim out/slide out mode is selected. Similarly, if minibutton 830 is selected, the trim in/slide in mode is selected. The trim icon (icon 412, FIG. 3) determines whether the trim or slide function is to be performed. The system provides the necessary feedback to indicate to the user the mode currently available. For example, in the present embodiment, if the trim mode is selected, the minibutton will be graphically represented in triangular form 822 as illustrated in FIG. 7c. If the slide mode is selected, the shape 824 will be diamond as illustrated in FIG. 7d.

If the slide out mode is selected using the trim icon and minibutton 822, the out point of the selected clip is shifted. Accordingly, the duration of the clip becomes longer or shorter depending upon which direction the out point is moved. The out point is preferably modified by dragging the slide out icon 822 to the desired point using the cursor control device. As the video source device is queued with the corresponding video, the user gets instantaneous feedback of corresponding video as the out point is shifted.

Figure 8A:
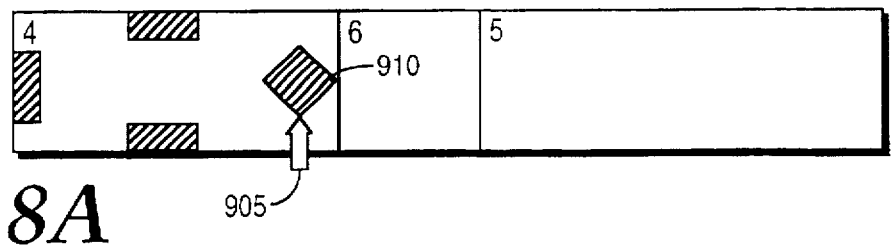
FIGS. 8a, 8b, 8c, 8d and 8e illustrate the slide out function in accordance with the teachings of the present invention.
Figure 8B:
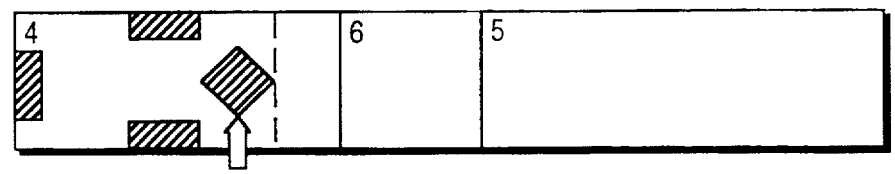
Figure 8C:
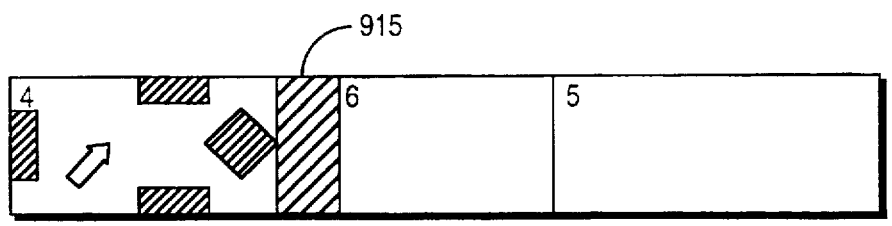
Figure 8D:
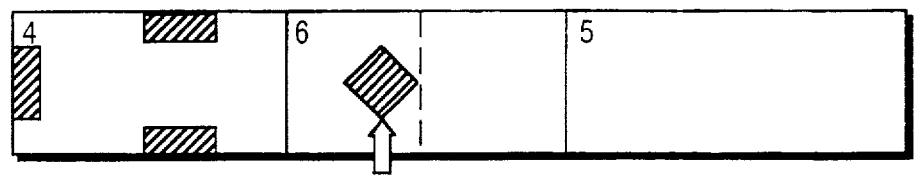
Figure 8E:
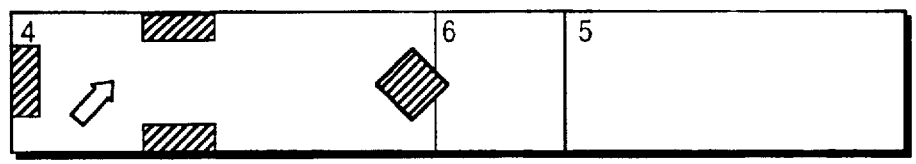

The process is best explained with reference to FIG. 8a–FIG. 8c. FIG. 8a illustrates a portion of the timeline wherein the selected clip provides feedback that the trim out mode was selected. Using the cursor control device to control movement of the cursor 905, the user moves the cursor to be positioned over the diamond button 910 representative of the slide out mode and drags the button 910 to the desired position. FIG. 8b. As the user drags the button 910, the video corresponding to the changed location of the out point is displayed in playback area 320 (FIG. 3). In addition, the adjacent in point of the adjacent clip, e.g., clip 6, is preferably concurrently shown in a second playback area, for example, an area defined on a second monitor, or a portion of playback area 320. Thus the user can instantly view how the slide out operation affects the edited clip and the adjacent clip. Once the user completes the drag, the out point of the clip is adjusted and visual feedback is provided to indicate the change. In the example shown in FIG. 8c, the out point was shifted to the left, resulting in shortening the length of clip 4. The in point of clip 6 is not affected, resulting in a space where no video exists. Alternately, if the out point is moved to the right, as illustrated in FIGS. 8d and 8e, the duration of the clip is increased, overlaying the adjacent clip 6. The displays concurrently show the change in the out point of clip 4 and the in point of clip 6. Once the drag is complete, the overall duration of events on the timeline remain the same, but clip 4 is longer and clip 6 is shorter.

Figure 9A:
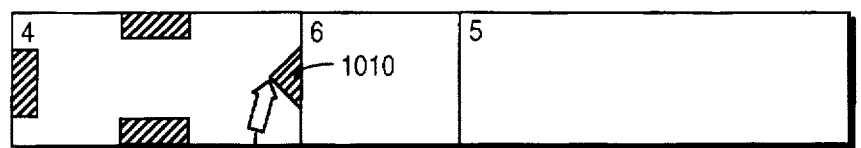
FIGS. 9a, 9b, 9c, 9d and 9e illustrate the trim out function in accordance with the teachings of the present invention.
Figure 9B:
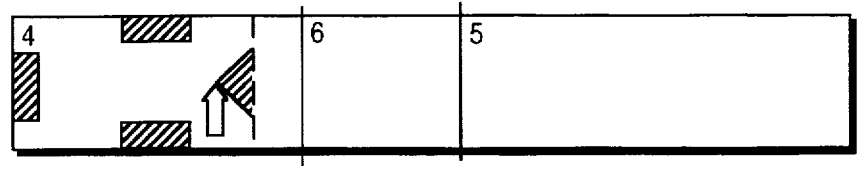
Figure 9C:
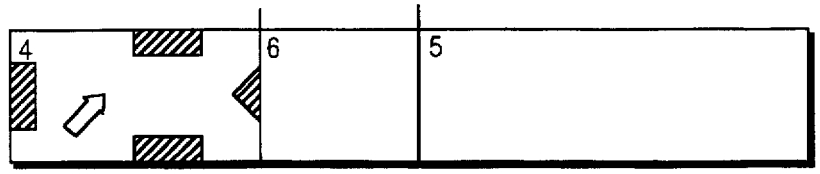
Figure 9D:
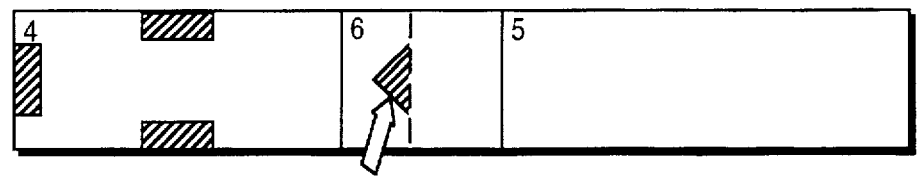
Figure 9E:
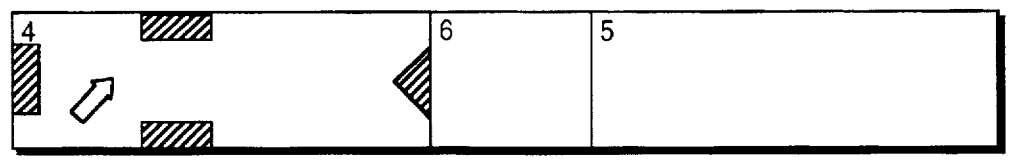

The trim out mode differs from the slide out mode in that the in point of the adjacent clip is not affected and the total duration of the clips is increased or decreased when the out point is shifted to the right or left. This is illustrated by FIGS. 9a–9e. FIG. 9a illustrates the selection of the trim mode and the movement of the cursor 1005 to the triangular button 1010. FIG. 9b illustrates movement of the out point to the left resulting in the shortening of clip 4 and the shifting of clips 6 and 5 as shown in FIG. 9b. Similarly, FIG. 9d illustrates the movement of the out point of clip 4 to the right and the lengthening of clip 4 and shifting of clips 6 and 5, thereby increasing the total duration of clips on the timeline.

Selection of button 830 (FIG. 7) will select the trim in/slide in mode. The trim in/slide in mode operates the same way on the in point as is described above with respect to the out point. Thus, the user can graphically edit clips in a simple manner to generate an edited product.

As discussed above, during various operations described, it is desirable to play back clips or portions of clips. In such cases, the input device, e.g., VTR, is cued to the appropriation location and played back. However, it is preferable to store clips in digital form in a memory that can be quickly accessed. In addition, to effectively provide multiple displays, such as that discussed above with respect to editing operations, quick access of video is necessary. For example, the system disclosed in FIGS. 1 and 2 provide a disk memory that is preferably used to store clips in digital form. In addition, buttons, e.g. button 390 (FIG. 3), are provided on the GUI to enable the user selectively store clips. In this example, the user would select the log card of interest and select the record function to cause the input device, e.g., VTR, to play back the corresponding video so that the system can digitize the video, if needed, and store the video in disk memory. Preferably, the record process is performed in the background so that the user can continue to create log cards, preview video and edit video while the recording process is ongoing. It should be noted that the process of recording a video signal onto a disk is sometimes referred to as "digitizing". However, in the system and method of the present invention, the input signals to be recorded may be either in analog format or in digital format. Therefore, the process may be described as transcoding from the input format into one more suitable for recording on disk, which may include the application of image compression techniques. The present invention refers to all such processes as "recording to disk".

Preferably, an innovative auto-record mode is provided in the system. This enables clips to be automatically recorded to digital memory, such as disk memory, in the background in a manner transparent to the user. This mode is preferably selected using a function key or specific button on the display (e.g., auto-save button 352, FIG. 3). Typically, a user in the process of finding clips of interest to use, will fast forward and rewind (also referred to as "shuttle") until a point of interest is found. The auto-record mode takes advantage of this by automatically recording video whenever the user selects normal forward play. If the user creates a log card, the corresponding log card information is stored with the recorded video, including timecodes or other information identifying the appropriate in points and out points of the log card. The system can also be configured to record those clips not associated with a log card in the disk memory for subsequent and rapid access by automatically generating a log card for each clip created when normal play is engaged.

Figure 10:
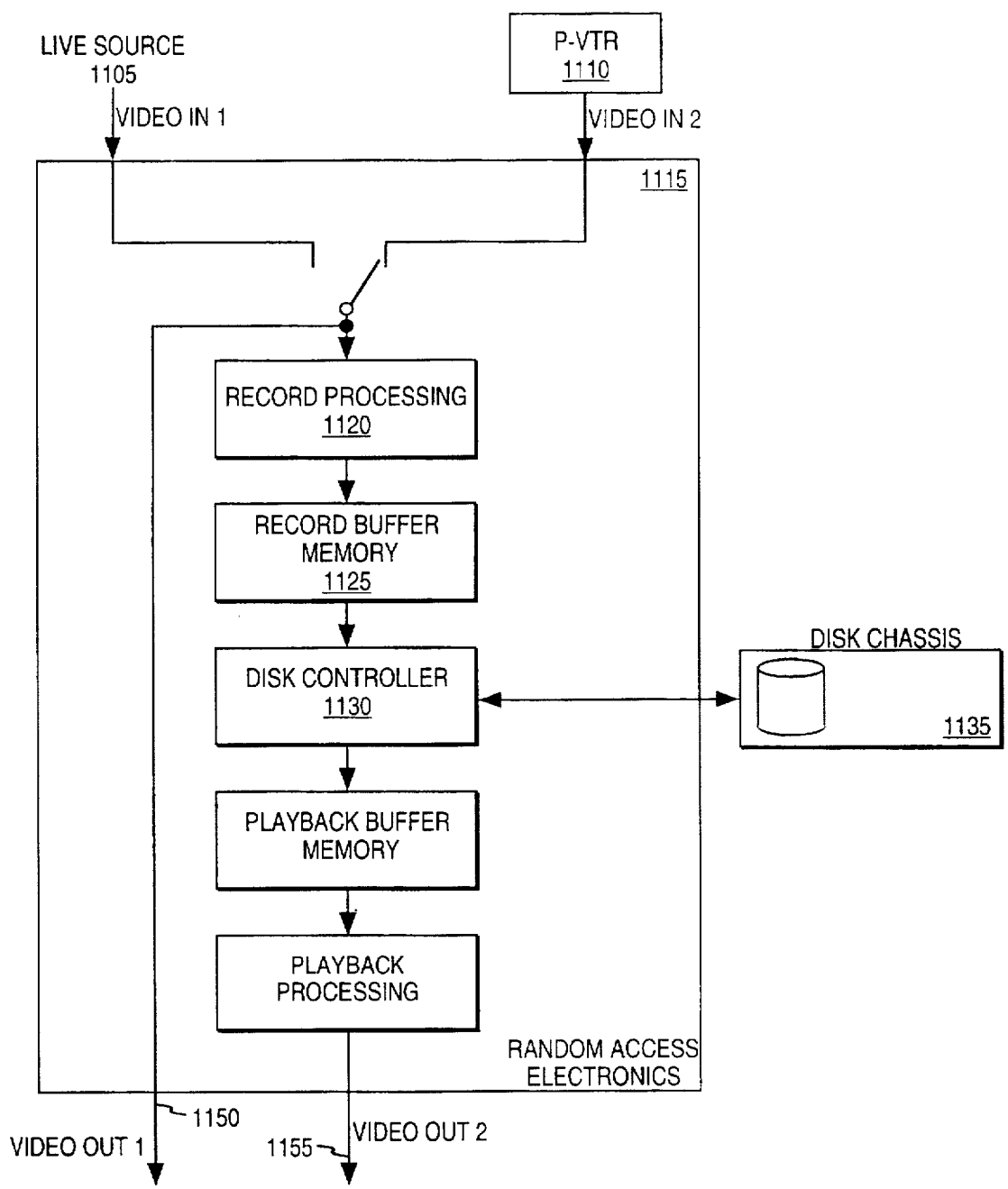
FIG. 10 is a simplified block diagram of the system that enables the simultaneous recording and playback of moving images.

As mentioned above, it is preferred that the recording process be performed in a manner transparent to the user. Thus, it is desirable to provide a system that can seemingly concurrently play back and record video data so that the user does not have to wait for the completion of the recording function before proceeding. This function is preferably implemented in a system such as is described with respect to FIGS. 1 and 2. FIG. 10 provides more detail as to the implementation and FIGS. 11a and 11b describe one embodiment of the process flow which enables concurrent recording and playback of video.

Referring to FIG. 10, the relevant portion of system receives input from at least one input source device, e.g., live video 1105 or playback VTR 1110. The circuitry 1115 is controlled by controller 10 (FIG. 1) and preferably contained within the random access electronics 250 shown in the embodiment of FIG. 2. Referring back to FIG. 10, the circuitry 1115, performs the recording of the input to a fast buffer memory, blocks 1120, 1125. The disk controller 1130 reads the record buffer memory 1125 and stored the data in the disk memory 1135. As the disk controller rapidly controls read and write accesses, the disk controller 1130 can multiplex read and write accesses to the disk memory 1135 in order to perform seemingly simultaneous playback and record functions to the user.

To play back video from the disk memory 1135, the disk controller 1130 accesses the disk memory 1135 and stores it in playback buffer memory 1140. Playback processing circuitry 1145 retrieves the data from the playback buffer memory 1140 for output as video. In addition, simultaneous record and playback functionality is provided by the first video output 1150 which outputs the video as it is recorded. Preferably the second video output 1155 is used to play back video that has already been recorded. The controller 10 (FIG. 1) will select the video output 1150, 1155 accordingly.

Figure 11A:
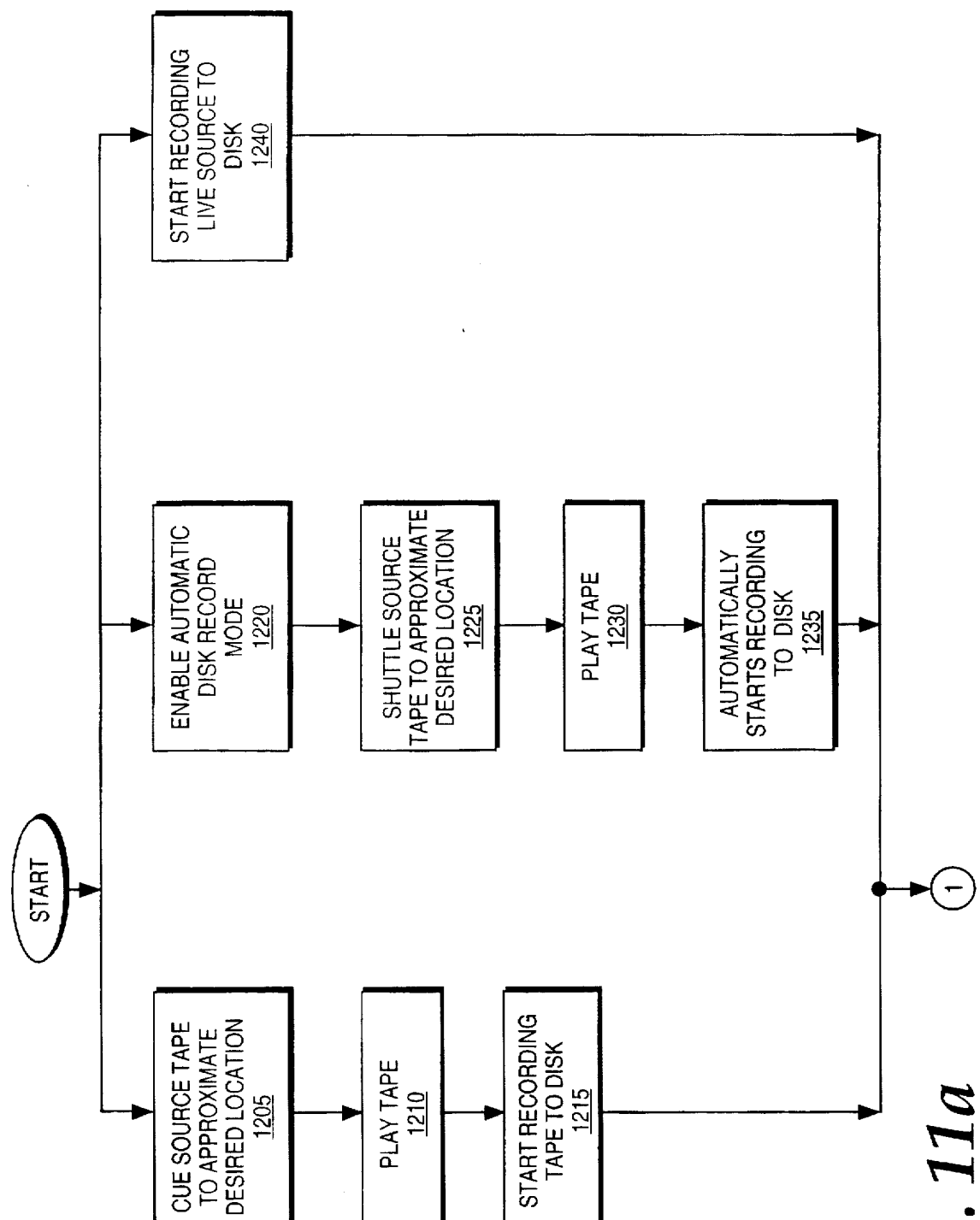
FIGS. 11a and 11b is a simplified flow diagram illustrating one embodiment of the process for the simultaneous recording and playback of moving images.
Figure 11B:
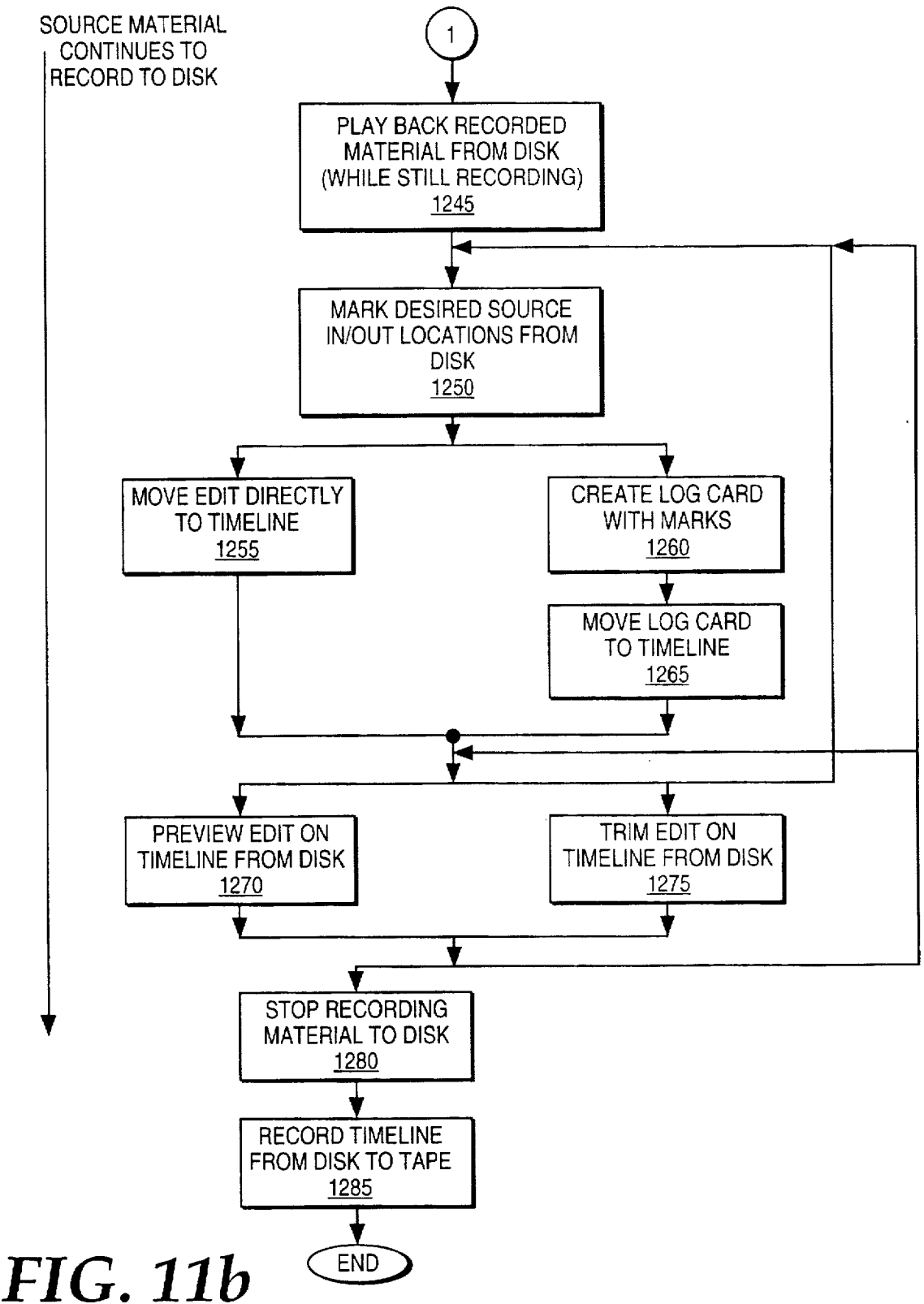

The processes set forth in FIGS. 11a and 11b illustrate the advantages to such a system. The processes set forth in FIGS. 11a and 11b are illustrative of one embodiment; other embodiments are also contemplated. Referring to FIG. 11a, the source tape can be cued to the desired location, step 1205, and the tape played at normal speed, step 1210, such that the system records the tape data played to the disk, step 1215. Preferably, an additional portion of material is recorded to disk, both before the specified in point (this additional material is referred to as the in margin) and after the specified out point (this additional material is referred to as the out margin). Thus, when subsequently editing the material, such as during a trimming process, such additional material may be accessed if it is desired to specify and edit wider than the initial choice given by the in and out points or to change an in point to be earlier, or an out point to be later, than the original in and out points.

Alternately, the automatic disk save (auto record) mode is enabled, 1220. The user can then shuttle the source tape to the approximate desired location, step 1225 and enter normal play 1230. The system responds by automatically recording to disk, step 1235. In addition, if the source is live, the video data is continually recorded to disk, step 1240. This is preferable so that editing functions can be subsequently performed. FIG. 11b illustrates the functions that can be performed while continuing to record source material to disk. At step 1245, the user can play back recorded material from disk while still recording source material. This may be advantageous when, for example, the user is creating log cards and wishes to rewind to review material. At step 1250, the user can mark in and out points and move the clip directly to the timeline, step 1255, or create log cards and move the log cards to the timeliness steps 1260, 1265.

The system enables the user to preview a clip located on the timeline by accessing the video stored on the disk, step 1270. Furthermore, the user can perform edit functions on the timeline, step 1275. At step 1280, the process of recording to disk is halted and the timeline is recorded from disk to tape, step 1285. As is readily apparent, it is not required to halt recording to disk before transferring the disk to the output tape. It is quite possible to record the timeline to tape while continuing to record input material to disk. Alternately, if the record process is ongoing using material originating from the playback device such as P-VTR and the user initiates an operation that requires access to the playback device at a different portion of the tape, for example, the system can log the editing functions entered and defer the functions until the playback device is available. Furthermore, the system can be configured, in such instances, to temporarily halt the background recording process to enable those functions involving the playback device to be executed.

A number of variations to the process and apparatus described herein is possible. For example, the auto-save button, once toggled to an on state, will remain in the on state until the user selects an alternate input source. Of course, the system can also be configured to maintain the on state, regardless of the switching of input sources, until the user toggle the auto-save button to the off state. Furthermore, it is preferred that when in the on state, and the input source is a live video source, the system continuously records the input video until the user toggles the auto-save button to the off state or the user switches source inputs. This differs from a tape input source wherein video is recorded only when the tape device is in normal play. In another embodiment, the system includes an auto-save lock button or option, which when selected, locks the recording mode into place to enable continuous recording to disk of the input video. Therefore, the tape device is maintained in normal play and the video input from the tape device, from the point at which the auto-save lock button is toggled to an on state to the end of the tape, is recorded on disk. Preferably, the recording of the tape continues even if the user switches input sources; this does not affect the background process of the system recording the video tape source to disk.

The invention has been described in conjunction with the preferred embodiment. It is evident that numerous alternatives, modifications, variations and uses will be apparent to those skilled in the art in light of the foregoing description.

What is claimed is:

1. A video editing apparatus comprising:
    video storage configured to store video data for a plurality of video scenes, each of said video scenes having a duration defined by an in point and an out point thereof;
    a first editor configured to edit at least one of said video scenes in a desirable order;
    a reproduction device configured to reproduce from video storage a first video data corresponding to an in point of selected one of said video scenes and a second video data corresponding to an out point of the video scene preceding said selected on of said video scenes;
    a display configured to simultaneously display said first video data and said second video data corresponding to an out point of the other of said two video scenes; and
    a second editor configured to change at least one of the in point of said selected one of said video scenes and the out point of said video scene preceding said selected on of said video scenes, wherein said second editor comprises soft trim buttons within the selected one of said video scenes.

2. The video editing apparatus according to claim 1, wherein there are first and second editing modes, in said first editing mode the in point of said selected one of said video scenes being changed while the out point of said video s scene preceding remains unchanged, and in said second editing mode the in point of said selected on e of said video scenes being changed while the out point of said video scene preceding is also changed so that the total duration of said selected one of said video scenes and said video scene preceding remains unchanged.

3. The video editing apparatus according to claim 1 wherein said reproduction device reproduces from said video storage a plurality of log cards capable of being displayed on said display reflecting at least one of said video scenes created during playback of said video scenes corresponding to said video data from at least one source device, each of said plurality of log cards comprising control data used to retrieve said video data corresponding to each of said plurality of log cards.

4. The video editing apparatus according to claim 1 wherein said reproduction device reproduces playback of said video scenes stored in said video storage, said playback capable of being displayed on said display said playback of said video scenes responsive to various editing functions including user selection of at least one of said video scenes to be displayed as at least one of said plurality of log cards.

5. The video editing apparatus according to claim 1 wherein said display is capable of displaying a time line area where at least one of said plurality of log cards displayed on said display means may be moved to, said time line area identifying the duration of said video data corresponding to said at least one of said plurality of log cards, said time line area displaying edits to said video data.

6. The video editing apparatus according to claim 3 wherein said control data displays the frame of at least one of said video scenes at which said in point is selected or the frame of at least one of said video scenes at which said out point is selected.

7. The video editing apparatus according to claim 3 wherein said control data comprises a log card number assigned to each of said plurality of log cards.

8. The video editing of claim 3 wherein said control data comprises source device identification from which at least one of said video scenes are retrieved.

9. The video editing apparatus according to claim 3 wherein said control data comprises time code information regarding at least one of said video scenes including duration of at least one of said video scenes, start point of said at least one of said video scenes, and end point of said at least one of said video scenes.

10. The video editing apparatus according to claim 1 wherein said first editor comprises various edit functions including at least one of said plurality of log cards to said time line area, insertion of at least one of said video scenes of selected log card between pre-existing at least one of said video scenes located on said time line area, shifting said selected video scenes for insertion between said pre-existing at least one of said video scenes located on said time line area, overlaying all or portions of said selected video scenes already placed on said time line areas, deleting said overlay portions of underlying pre-existing at least one of said video scenes, updating the corresponding said plurality of log cards, deleting selected said plurality of log cards, digitizing said video data corresponding to said selected plurality of log cards if not already in digital form, and storing said digitized said video data in a digital storage device such as disk storage or memory.

11. A video editing system comprising:
    video storage configured to store video data for a plurality of video scenes each of said video scenes having a duration defined by an in point and out point thereof;
    a first editor configured to edit at least one of said video scenes in a desirable order;
    a reproduction device configured to reproduce from said video storage a first video data corresponding to an in point of selected one of said video scenes and a second video data corresponding to an out point of the video scene preceding said selected one of said video scenes;

a display configured to simultaneously displaying said first video data and said second video data corresponding to an out point of the other of said two video scenes;

a playback device providing playback of moving images to said display; and a second editor configured to change at least one of the in point of said selected one of said video scenes and the out point of said video scene preceding said selected on of said video scenes, wherein said second editor comprises soft trim buttons within the selected one of said video scenes.

12. The video editing system according to claim 11, wherein there are first and second editing modes, in said first editing mode the in point of said selected one of said video scenes being changed while the out point of said video scene preceding remains unchanged, and in said second editing mode the in point of said selected one of said video scenes being changed while the out point of said video scene preceding is also changed so that the total duration of said selected one of said video scenes and said video scene preceding remains unchanged.

13. The video editing system according to claim 11 wherein said reproduction device reproduces a plurality of log cards capable of being displayed on said display and reflecting at least one of said video scenes created during playback of said video scenes, each of said plurality of log cards comprising control data used to retrieve said video data corresponding to each of said plurality of log cards.

14. The video editing system according to claim 11 wherein said reproduction device reproduces playback of said video scenes stored in said video storage, said playback capable of being displayed on said display said playback of said video scenes responsive to various editing functions including user selection of at least one of said video scenes to be displayed as at least one of said plurality of log cards.

15. The video editing system according to claim 11 wherein said display displays a time line area where at least one of said plurality of log cards displayed on said display may be moved to, said time line area identifying the duration of said video data corresponding to said at least one of said plurality of log cards, said time line area displaying edits to said video data.

16. The video editing system according to claim 13 wherein said control data comprises the frame of said at least one of video scenes at which said in point is selected or the frame of at least one of said video scenes at which said out point is selected.

17. The video editing system according to claim 13 wherein said control data comprises a log card number assigned to each of said plurality of log cards.

18. The video editing system of claim 13 wherein said control data comprises source device identification from which said at least one of said video scenes are retrieved.

19. The video editing system according to claim 13 wherein said control data comprises time code information regarding at least one of said video scenes including duration of at least one of said video scenes, start point of said at least one of said video scenes, and end point of said at least one of said video scenes.

20. The video editing system according to claim 11 wherein said first editor comprises various edit functions including insertion of at least one of said plurality of log cards to said time line area, insertion of at least one of said video scenes of selected log card between pre-existing at least one of said video scenes located on said time line area, shifting said selected video scenes to insert said selected video scenes between said pre-existing at least one of said video scenes located on said time line area, overlaying all or portions of said selected video scenes already placed on said time line area which overlap, deleting said overlay portions of underlying pre-existing at least one of said video scenes, updating the corresponding said plurality of log cards, deleting selected said plurality of log cards, digitizing said video data corresponding to said selected plurality of log cards if not already in digital form, and storing said digitized said video data in a digital storage device such as disk storage or memory.

21. A method for editing video comprising the steps of:

storing video data for a plurality of video scenes in a video storage, each of said video scenes having a duration defined by an in point and out point thereof;

editing at least one of said video scenes in a desirable order;

reproducing from said video storage a first video data corresponding to an in point of selected one of said video scenes and a second video data corresponding to an out point of the video scene preceding said selected one of said video scenes;

simultaneously displaying on a display said first video data and said second video data corresponding to an out point of the other of said two video scenes; and changing at least one of the in point of said selected one of said video scenes and the out point of said video scene preceding said selected on of said video scenes using an editor comprising soft trim buttons within the selected one of said video scenes.

22. The method according to claim 21, wherein there are first and second editing modes, in said first editing mode the in point of said selected one of said video scenes being changed while the out point of said video scene preceding remains unchanged, and in said second editing mode the in point of said selected one of said video scenes being changed while the out point of said video scene preceding is also changed so that the total duration of said selected one of said video scenes and said video scene preceding remains unchanged.

23. The method according to claim 21 further comprising the step of reproducing from said storage a plurality of log cards reflecting at least one of said video scenes created during playback of said video scenes, each of said plurality of log cards comprising control data used to retrieve video corresponding to each of said plurality of log cards.

24. The method according to claim 21 further comprising the step of reproducing playback of said video scenes stored in said video storage for various editing functions including user selection of at least one of said video scenes to be displayed as at least one of said plurality of log cards.

25. The method according to claim 21 further comprising the step of identifying the duration of said video data corresponding to said at least one of said plurality of log cards, said duration used during said step of editing.

26. The method according to claim 23 wherein said control data comprises the frame of said video scene at which said in point is selected or the frame of said video scene at which said out point is selected.

27. The method according to claim 23 wherein said control data identifies a log card number assigned to said each of said plurality of log cards.

28. The method of claim 23 wherein said control data identifies the source device from which said at least one of said video scenes are retrieved.

29. The method according to claim 23 wherein said control data comprises time code information regarding said at least one of said video scenes including duration of said at least one of said video scenes, start point of said at least one of said video scenes, and end point of said at least one of said video scenes.

30. The method according to claim 21, wherein said video data is recorded in analog form in said recording medium when said video data is reproduced, said video data reproduced is first digitized and stored in a disk memory in digital form.

* * * * *

UNITED STATES PATENT AND TRADEMARK OFFICE
CERTIFICATE OF CORRECTION

PATENT NO. : 5,760,767
DATED : June 2, 1998
INVENTOR(S) : Shore, et al.

It is certified that error appears in the above-indentified patent and that said Letters Patent is hereby corrected as shown below:

In column 12 at line 55 delete "timeliness" and insert --timelines,--

Signed and Sealed this

Twenty-sixth Day of October, 1999

*Attest:*

Q. TODD DICKINSON

*Attesting Officer*  *Acting Commissioner of Patents and Trademarks*